(12) United States Patent
Chemali et al.

(10) Patent No.: US 7,915,895 B2
(45) Date of Patent: Mar. 29, 2011

(54) METHOD OF CALIBRATING AN AZIMUTHAL INDUCTIVE CROSS-COIL OR TILTED COIL INSTRUMENT

(75) Inventors: Roland E. Chemali, Humble, TX (US); Wallace H. Meyer, Spring, TX (US); Gulamabbas Merchant, Houston, TX (US); Tsili Wang, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 803 days.

(21) Appl. No.: 11/767,359

(22) Filed: Jun. 22, 2007

(65) Prior Publication Data

US 2008/0315883 A1 Dec. 25, 2008

(51) Int. Cl.
*G01V 3/28* (2006.01)
(52) U.S. Cl. ............................. 324/339; 324/337; 702/7
(58) Field of Classification Search .......... 324/334–335, 324/337–339; 702/7, 11–13, 106
See application file for complete search history.

(56) References Cited

U.S. PATENT DOCUMENTS

| | | | |
|---|---|---|---|
| 3,094,658 A | 6/1963 | Bravenec et al. | |
| 3,124,742 A | 3/1964 | Schneider | |
| 3,340,464 A | 9/1967 | Gouilloud | |
| 3,808,520 A | 4/1974 | Runge | |
| 3,890,563 A | 6/1975 | Dowling et al. | |
| 3,996,518 A | 12/1976 | Halstead et al. | |
| 4,302,722 A | 11/1981 | Gianzero | |
| 4,367,647 A | 1/1983 | Barnoud et al. | |
| 4,416,494 A | 11/1983 | Watkins et al. | |
| 4,455,529 A | 6/1984 | Sinclair | |
| 4,471,436 A | 9/1984 | Schaefer et al. | |
| 4,514,693 A | 4/1985 | Meador | |
| 4,651,101 A | 3/1987 | Barber et al. | |
| 4,720,681 A * | 1/1988 | Sinclair .......................... | 324/339 |
| 4,808,929 A | 2/1989 | Oldigs | |
| 4,837,517 A | 6/1989 | Barber .......................... | 324/339 |
| 4,857,852 A | 8/1989 | Kleinberg et al. | |
| 5,065,099 A | 11/1991 | Sinclair et al. | |
| 5,157,605 A | 10/1992 | Chandler et al. .............. | 364/422 |

(Continued)

FOREIGN PATENT DOCUMENTS

EP 0289418 A2 11/1988

(Continued)

OTHER PUBLICATIONS

L.A. Tabarovskii et al., "Radial Characteristics of Induction Focusing Probes with Transverse Detectors in an Anisotropic Medium", Nauka, Soviet Geology and Geophysics, vol. 20, No. 7, 1979, pp. 81-90.

(Continued)

*Primary Examiner* — Bot L LeDynh
(74) *Attorney, Agent, or Firm* — Mossman Kumar & Tyler PC

(57) ABSTRACT

A phase error in measurements made by a resistivity logging tool is estimated by positioning the tool above a conducting surface. Deviation of the measured phase difference between the transmitter and the receiver from 90° gives the phase error in the electronics. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

19 Claims, 3 Drawing Sheets

U.S. PATENT DOCUMENTS

| | | | |
|---|---|---|---|
| 5,293,128 A | 3/1994 | Zhou | |
| 5,343,001 A | 8/1994 | Cowles et al. | |
| 5,452,761 A | 9/1995 | Beard et al. | 166/250 |
| 5,500,597 A | 3/1996 | Tickell, Jr. et al. | |
| 5,508,616 A * | 4/1996 | Sato et al. | 324/343 |
| 5,600,246 A | 2/1997 | Forgang et al. | 324/339 |
| 5,708,204 A | 1/1998 | Kasap | |
| 5,781,436 A | 7/1998 | Forgang et al. | 364/422 |
| 5,789,995 A | 8/1998 | Minasi | |
| 5,811,972 A | 9/1998 | Thompson et al. | |
| 5,869,968 A | 2/1999 | Brooks et al. | |
| 5,883,515 A | 3/1999 | Strack et al. | |
| 5,999,883 A | 12/1999 | Gupta et al. | 702/7 |
| 6,064,210 A | 5/2000 | Sinclair | |
| 6,147,496 A | 11/2000 | Strack et al. | 324/343 |
| 6,150,954 A | 11/2000 | Smith | |
| 6,311,045 B1 | 10/2001 | Domokos | |
| 6,487,395 B1 | 11/2002 | Durec et al. | |
| 6,603,312 B2 * | 8/2003 | Sinclair | 324/339 |
| 6,734,675 B2 | 5/2004 | Fanini et al. | |
| 2002/0101242 A1 | 8/2002 | Bittar | |
| 2002/0105333 A1 * | 8/2002 | Amini | 324/338 |
| 2004/0046560 A1 | 3/2004 | Itskovich et al. | |
| 2004/0056663 A1 | 3/2004 | Sinclair et al. | |
| 2004/0113609 A1 | 6/2004 | Homan et al. | |
| 2004/0140809 A1 | 7/2004 | Mercer | |
| 2004/0217763 A1 | 11/2004 | Moore | |
| 2005/0088180 A1 | 4/2005 | Flanagan | |
| 2005/0143920 A1 | 6/2005 | Barber et al. | |
| 2005/0256644 A1 | 11/2005 | Xiao | |
| 2006/0043973 A1 | 3/2006 | Chen et al. | |
| 2006/0103389 A1 | 5/2006 | Bespalov et al. | |
| 2006/0135083 A1 | 6/2006 | Leinonen et al. | |

FOREIGN PATENT DOCUMENTS

| | | |
|---|---|---|
| WO | WO9800733 | 1/1998 |

OTHER PUBLICATIONS

Wilt et al., "Electromagnetic Methods for Development and Production: State of the Art", The Leading Edge, Apr. 1998, pp. 487-491.

Zhou et al., "Reservoir Monitoring with Interwell Electromagnetic Imaging", Chevron Petroleum Technology Company, (date: unknown), pp. 1-10.

Zhou et al., "A Review of Interwell Electromagnetic Methods for Reservoir Characterization", (date: unknown), pp. 1-8.

Maher et al., "The Transverse Induction Logging Tool (TILT) Provides Enhanced Evaluation Results in The Cognac Field, Gulf of Mexico", May 1999, pp. 1-8.

J. H. Moran et al.; *Basic Theory of Induction Logging and Application to Study of Two-Coil Sondes*, Geophysics, vol. XXVIII, No. 6, Part I (Dec. 1962), pp. 829-858.

* cited by examiner

METHOD OF CALIBRATING AN AZIMUTHAL INDUCTIVE CROSS-COIL OR TILTED COIL INSTRUMENT

BACKGROUND OF THE DISCLOSURE

1. Field of the Disclosure

The present disclosure is related to the field of apparatus design in the field of oil exploration. In particular, the present disclosure describes a method for calibrating multicomponent logging devices used for detecting the presence of oil in boreholes penetrating a geological formation.

2. Description of the Related Art

Electromagnetic induction resistivity well logging instruments are well known in the art. Electromagnetic induction resistivity well logging instruments are used to determine the electrical conductivity, and its converse, resistivity, of earth formations penetrated by a borehole. Formation conductivity has been determined based on results of measuring the magnetic field of eddy currents that the instrument induces in the formation adjoining the borehole. The electrical conductivity is used for, among other reasons, inferring the fluid content of the earth formations. Typically, lower conductivity (higher resistivity) is associated with hydrocarbon-bearing earth formations. The physical principles of electromagnetic induction well logging are well described, for example, in, J. H. Moran and K. S. Kunz, *Basic Theory of Induction Logging and Application to Study of Two-Coil Sondes*, Geophysics, vol. 27, No. 6, part 1, pp. 829-858, Society of Exploration Geophysicists, December 1962. Many improvements and modifications to electromagnetic induction resistivity instruments described in the Moran and Kunz reference, supra, have been devised, some of which are described, for example, in U.S. Pat. No. 4,837,517 to Barber, in U.S. Pat. No. 5,157,605 to Chandler et al., and in U.S. Pat. No. 5,600,246 to Fanini et al.

In a vertical borehole, a conventional induction logging tool with transmitters and receivers (induction coils) oriented only along the borehole axis responds to the average horizontal conductivity that combines the conductivity of both sand and shale. These average readings are usually dominated by the relatively higher conductivity of the shale layers and exhibit reduced sensitivity to the lower conductivity sand layers where hydrocarbon reserves are produced. To address this problem, loggers have turned to using transverse induction logging tools having magnetic transmitters and receivers (induction coils) oriented transversely with respect to the tool longitudinal axis. Such instruments for transverse induction well logging have been described in PCT Patent publication U.S. Pat. No. 6,147,496 of Strack et al., U.S. Pat. No. 5,452,761 to Beard et al.; U.S. Pat. No. 5,999,883 to Gupta et al.; and U.S. Pat. No. 5,781,436 to Forgang et al.

In the induction logging instruments, the acquired data quality depends on the formation electromagnetic parameter distribution (conductivity) in which the tool induction receivers operate. Thus, in the ideal case, the logging tool measures magnetic signals induced by eddy currents flowing in the formation. Variations in the magnitude and phase of the eddy currents occurring in response to variations in the formation conductivity are reflected as respective variations in the output voltage of receivers. In the conventional induction instruments, these receiver induction coil voltages are conditioned and then processed using analog phase sensitive detectors or digitized by digital-to-analog converters and then processed with signal processing algorithms. The processing allows for determining both receiver voltage amplitude and phase with respect to the induction transmitter current or magnetic field waveform. It has been found convenient for further uphole geophysical interpretation to deliver the processed receiver signal as a vector combination of two voltage components: one being in-phase with transmitter waveform and another out-of-phase, quadrature component. Theoretically, the in-phase coil voltage component amplitude is the more sensitive and noise-free indicator of the formation conductivity.

An important aspect of using such tools is proper positioning, orientation and calibration of the coils of the tools. Aspects of such positioning and orientation are addressed in U.S. patent application Ser. No. 11/400,097 of Rabinovich et al., (now U.S. Pat. No. 7,379,818), U.S. patent application Ser. No. 11/398,838 of Rabinovich et al., now U.S. Pat. No. 7,268,555, and U.S. patent application Ser. No. 11/400,536 of Rabinovich et al., (now U.S. Pat. No. 7,333,891), all having the same assignee as the present application and the contents of which are incorporated herein by reference. The present disclosure addresses errors in the electronics.

SUMMARY OF THE DISCLOSURE

One embodiment of the disclosure is a method of using a logging tool having at least one transmitter coil and at least one receiver coil for making multicomponent measurements. The method includes positioning the logging tool above a conducting surface, orienting the tool so that an axis of the at least one transmitter coil is substantially parallel to the surface and an axis of the at least one receiver coil is substantially non-horizontal, activating the at least one transmitter coil and receiving a signal in the at least one receiver coil resulting from the activation, determining from the signal a phase error in the signal, and recording the phase error and/or a phase correction derived from the phase error on a suitable medium. The logging tool may be adapted for use in a borehole and the at least one transmitter coil may comprise two transmitter coils operated sequentially. The at least one receiver coil may include two receiver coils. Determining the phase error may further include measuring a phase difference between a current in the transmitter coil and the signal. Determining the phase error may also involve measuring differences in phase between currents in the two transmitter coils and corresponding signals in the receiver coils at a plurality of rotational angles of the tool and determining an average of these differences. The method may further include measuring an amplitude of the signal and determining an amplitude error by comparing the measured amplitude with an amplitude obtained from a modeling simulation. The amplitude error and/or an amplitude correction may be recorded on a suitable medium. The method may further include conveying the logging tool into a borehole and making measurements with the at least one transmitter coil and the at least one receiver coil, applying phase corrections, or phase amplitude corrections, to the measurements to provide corrected measurements, and using the corrected measurements for determining a formation resistivity and/or reservoir navigation. Positioning the logging tool above a conducting surface may include using a non-magnetic metal.

Another embodiment is an apparatus for evaluating an earth formation. The apparatus includes a logging tool having at least one transmitter coil and at least one receiver coil configured for making multicomponent measurements. The logging tool is configured to be positioned substantially parallel to a conducting surface. The apparatus also includes a processor configured to determine a phase error in the signal in the at least one receiver coil resulting from activation of the at least one transmitter coil, and recording the phase error and/or a phase correction on a suitable medium. The logging tool may be configured for use in a borehole in the earth formation and the at least one transmitter coil may include two transmitter coils configured to be operated sequentially. The at least one receiver coil may include two receiver coils. The processor may be configured to determine the phase error by measuring a difference in phase between a current in the at least one transmitter coil and the signal. The processor may be further configured to determine an amplitude error by comparing the amplitude of the signal with an amplitude obtained from a modeling simulation, and recording the amplitude error and/or an amplitude correction on a suitable medium. The apparatus may further include a downhole assembly configured to convey logging tool into a borehole and make measurements with the at least one transmitter coil and the at least one receiver coil, and a processor may be further configured to applying a phase correction, or a phase-correction and an amplitude correction, to the measurements made in the borehole to provide corrected measurements, and use the corrected measurements for determining a formation resistivity and/or reservoir navigation. The conducting surface may be a nonmagnetic metal.

Another embodiment disclosed is a computer-readable medium for use with a logging tool having at least one transmitter coil and at least one receiver coil configured to make multicomponent induction measurements, the logging tool configured to be positioned substantially parallel to a conducting surface, the medium including instructions that enable a processor to determine a phase error in the signal at the receiver coil resulting from activation of the transmitter coil, and record the phase error and/or a phase correction on a suitable medium. The logging tool may be configured for use in a borehole. The medium may include a ROM, an EPROM, an EAROM, a Flash Memory, and an optical disk.

BRIEF DESCRIPTION OF THE DRAWINGS

For detailed understanding of the present disclosure, reference should be made to the following detailed description of the preferred embodiment, taken is conjunction with the accompanying drawings, in which like elements have been given like numerals and wherein.

DETAILED DESCRIPTION OF THE DISCLOSURE

Figure 1:
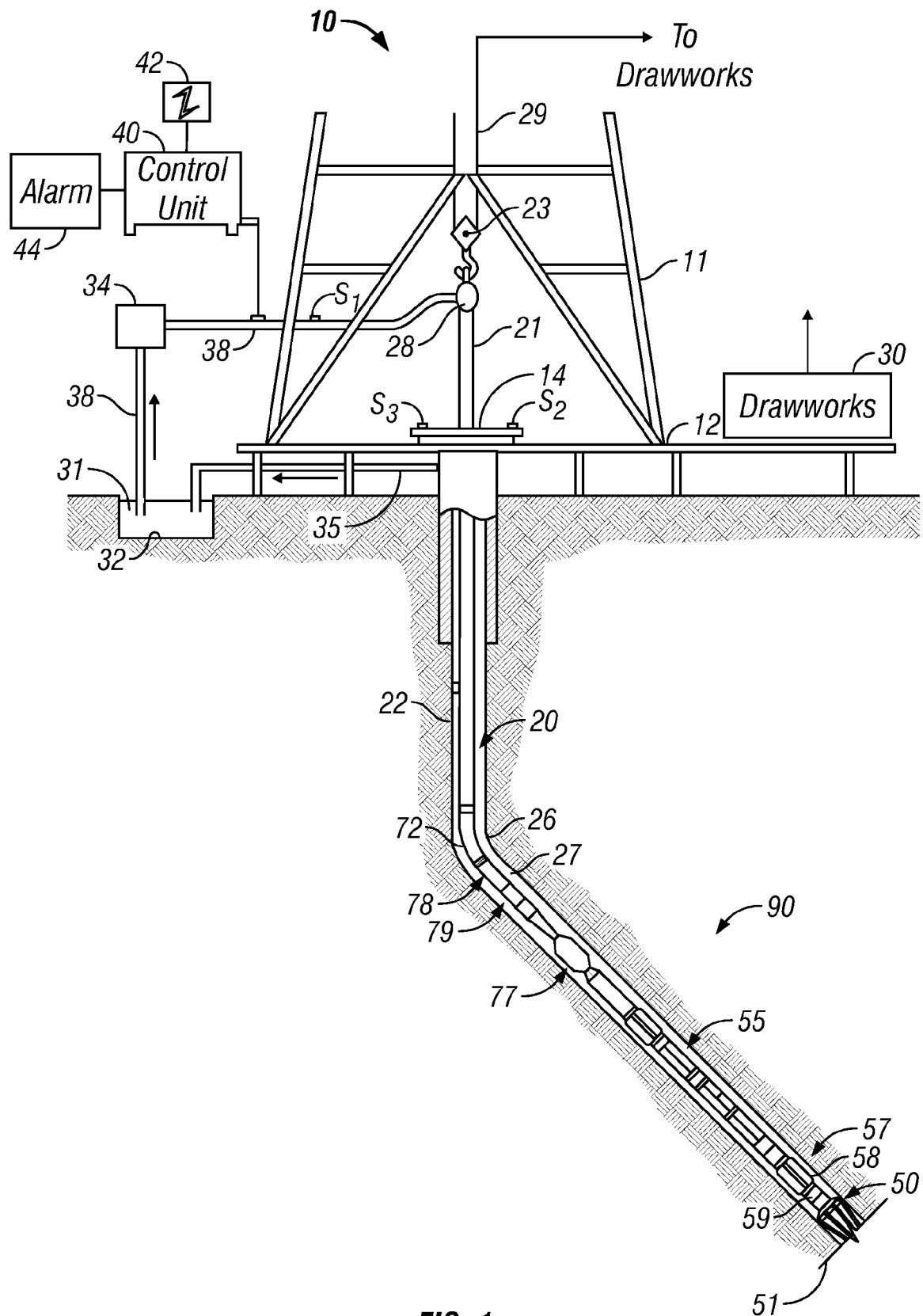
FIG. 1 (prior art) shows a schematic diagram of a drilling system having a drill string that includes a sensor system according to the present disclosure.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the draw-works is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur.

Figure 2:
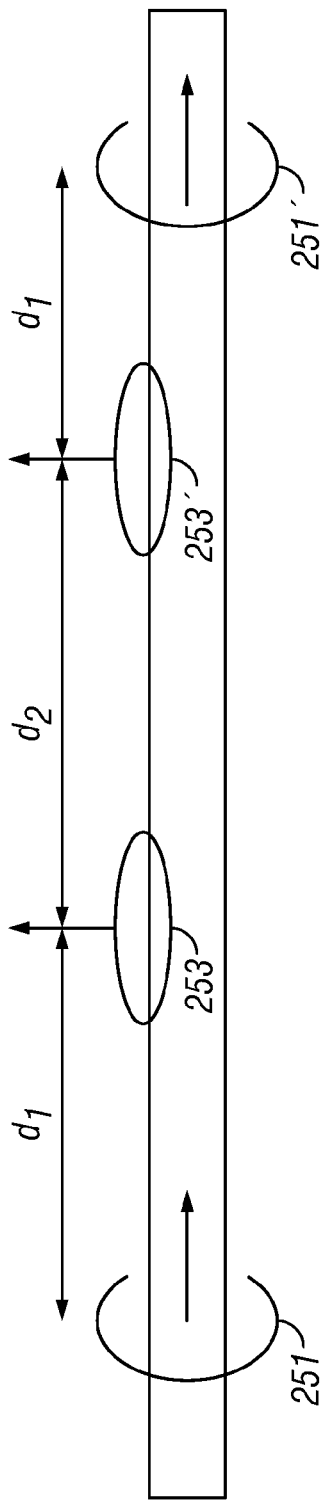
FIG. 2 illustrates an exemplary transmitter and receiver configuration of a logging tool for use with the method of the present disclosure.

FIG. 2 shows an azimuthal resistivity tool configuration suitable used to illustrate the method of the present disclosure. A method of using the tool is discussed in U.S. patent application Ser. No. 11/489,875 of Wang et al. (now U.S. Pat. No. 7,483,793, having the same assignee as the present disclosure. The tool comprises two transmitters 251, 251' whose dipole moments are parallel to the tool axis direction and two receivers 253, 253' that are perpendicular to the transmitter direction. In one embodiment of the disclosure, the tool operates at 400 kHz frequency. When the first transmitter fires, the two receivers measure the magnetic field produced by the induced current in the formation, and so does the second transmitter. The signals are combined in following way:

$$H_{T1} = H_2 - (d_1/(d_1+d_2))^3 \cdot H_1$$

$$H_{T2} = H_1 - (d_1/(d_1+d_2))^3 \cdot H_2 \quad (1).$$

Figure 4:
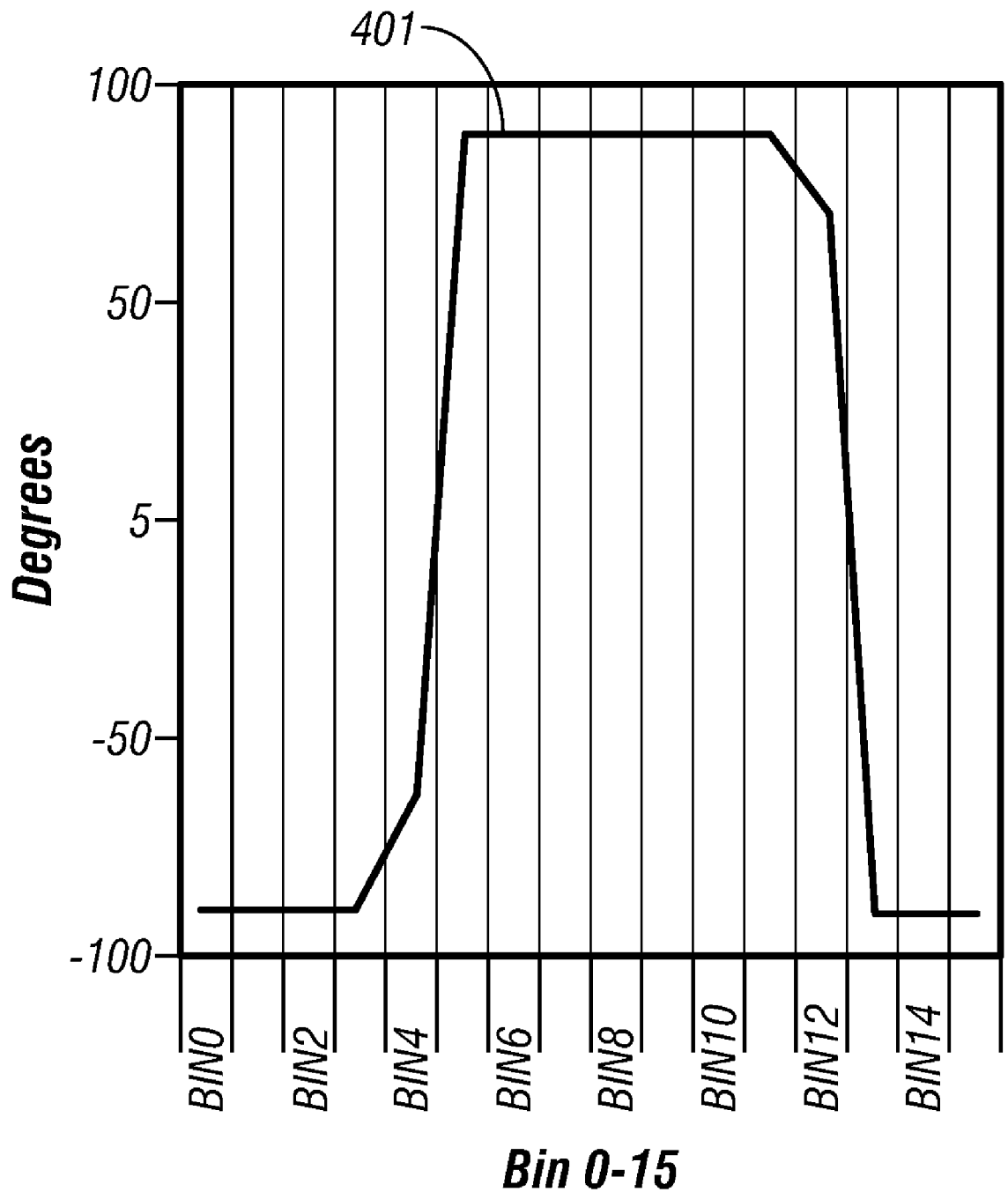
FIG. 4 illustrates an exemplary variation in the phase measurement as a tool is rotated.

Here, $H_1$ and $H_2$ are the measurements from the first and second receivers, respectively, and the distances $d_1$ and $d_2$ are as indicated in FIG. 4. The tool rotates with the BHA and in an exemplary mode of operation, makes measurements at 16 angular orientations 22.5° apart. The measurement point is at the center of two receivers. In a uniform, isotropic formation, no signal would be detected at either of the two receivers. The disclosure thus makes use of cross component measurements, called principal cross-components, obtained from a pair of longitudinal transmitters disposed on either side of at least one transverse receiver. It should further be noted that using well known rotation of coordinates, the method of the present disclosure also works with various combinations of measurements as long as they (i) correspond to signals generated from opposite sides of a receiver, and, (ii) can be rotated to give the principal cross components.

The dual transmitter configuration has also been discussed in U.S. patent application Ser. No. 11/298,255 of Yu et al., (now U.S. Pat. No. 7,471,088), having the same assignee as the present disclosure and the contents of which are incorporated herein by reference.

Figure 3:
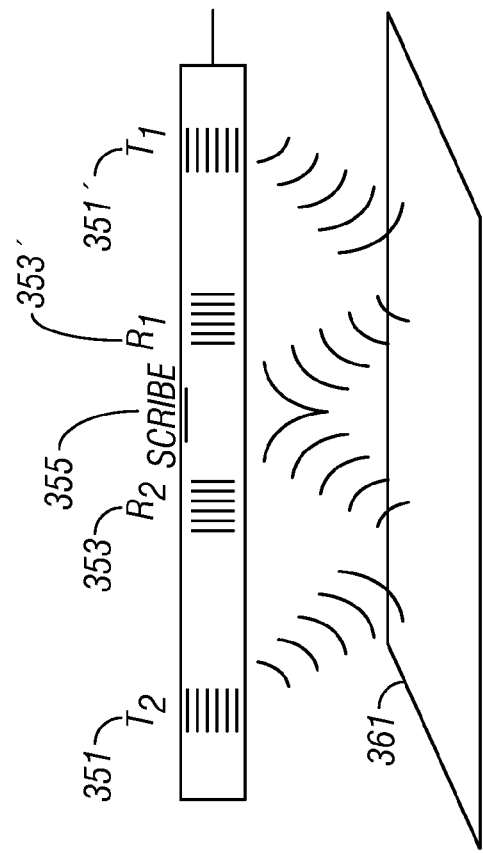
FIG. 3 illustrates the arrangement of the logging tool during calibration.

Tool calibration compensates for the phase shift in the antenna circuits and electronics. This is accomplished by positioning the tool horizontally above a metal plate 361 as shown in FIG. 3. In one embodiment of the disclosure, the plate is made of a non-magnetic metal such as aluminum, non-magnetic steel, titanium, copper, brass etc. and extends over an area of at least 8'×4' (2.4 m×1.2 m). Instead of the antenna coils being shown (as in FIG. 2), slots on the antenna cover are shown in FIG. 3. Each of the two transmitter coils 351, 351' is activated and the echo signal at each of the two receiver coils 353, 353' is measured. For this calibration, the reference scribe 355 is vertical, so that the receiver coils are vertical. Under ideal conditions all received signals should show a 90° phase shift. In reality, due to inherent phase shifts in the electronics and antenna, measured phase shifts are likely to be different from 90°, and somewhat different from each other. The calibration procedure consists of determining the phase correction needed to be applied to bring all phase readings to 90°.

FIG. 4 shows the measured phase difference between one of the transmitters (T1) and one of the receivers (R1) as the tool is rotated and the transmitter is activated. The abscissa represents the rotation angle binned into 16 sectors of 22.5° each. The left and right edge corresponds to the boundary between Bin 0 and Bin 15 (the scribe at the top, receiver coil axis vertical) while the boundary between bins 7 and 8 is with the scribe at the bottom. As can be seen, the curve 401 has a sharp transition between about −90° and +90° between bins 3 and 4 (receiver coil horizontal). The phase error of this particular transmitter-receiver combination is taken as the difference between 90° and the measured phase for sector 0. The phase correction based on this phase error is then applied to the measurements made with this transmitter-receiver combination. A similar phase correction may also be applied to the other transmitter-receiver combinations. Once the phase correction is made, the amplitudes of the signals are used for other applications such as determination of formation resistivity and in reservoir navigation (determination of distance to an interface in the earth formation). Use in reservoir navigation of such measurements is discussed, for example, in the Wang application.

In another embodiment of the disclosure, the errors for the four transmitter-receiver combinations are averaged and an average correction is applied to all the measurements.

In one embodiment of the disclosure, amplitudes of signals are measured at each of the two receivers in response to activation of each of the tool transmitters. These measured amplitudes are compared to amplitudes predicted from modeling simulations and an amplitude correction is applied to the measurements. By the application of amplitude and phase corrections, using the amplitudes of the corrected measurements, improved estimates of formation properties may be obtained and reservoir navigation improved. Those versed in the art would recognize that applying amplitude and/or phase corrections is equivalent to correcting the in phase and quadrature component of the signals.

It should be noted that the description of the method using an axial transmitter and a transverse receiver is not to be construed as a limitation to the disclosure. The method of amplitude and phase calibration is equally applicable with any arrangement of tilted antenna coils.

It should be noted that the description of the disclosure with reference to a measurement while drilling configuration is not to be construed as a limitation. Some aspects of the disclosure may also be practiced with a logging tool conveyed on a logging string into a borehole. For the purposes of this disclosure, a logging string and a bottomhole assembly may be collectively referred to as a downhole assembly.

The foregoing description is directed to particular embodiments of the present disclosure for the purpose of illustration and explanation it will be apparent, however, to one skilled in the art that many modifications and changes to the embodiments set forth above are possible without departing from the scope and the spirit of the disclosure. It is intended that the following claims be interpreted to embrace all such modifications and changes.

What is claimed is:

1. A method of using a logging tool having at least one transmitter coil and at least one receiver coil for making multicomponent measurements, the method comprising:

positioning the logging tool parallel to a plate having a flat conducting surface;
orienting the tool so that an axis of the at least one transmitter coil is substantially parallel to the surface and an axis of the at least one receiver coil is substantially non-horizontal;
activating the at least one transmitter coil and receiving a signal in the at least one receiver coil resulting from the activation;
determining from the signal a phase error in the signal; and
recording at least one of (I) the phase error, and (II) a phase correction derived from the phase error, on a suitable medium.

2. The method of claim 1 wherein:
(i) the logging tool is adapted for use in a borehole in the earth formation;
(ii) the at least one transmitter coil comprises two transmitter coils operated sequentially.

3. The method of claim 1 wherein:
(i) the logging tool is adapted for use in a borehole in the earth formation; and
(ii) the at least one receiver coil comprises two receiver coils.

4. The method of claim 1 wherein determining the phase error further comprises:
measuring a difference in phase between a current in the at least one transmitter coil and the signal.

5. The method of claim 2 wherein determining the phase error further comprises
(i) measuring a difference in phase between a current in the two transmitter coils and the corresponding signals in the two receiver coils at a plurality of rotational angles of the tool, and
(ii) determining an average of said differences.

6. The method of claim 1 further comprising:
(i) measuring an amplitude of the signal;
(ii) determining an amplitude error by comparing the measured amplitude with an amplitude obtained from a modeling simulation; and
(iii) recording at least one of (i) the amplitude error, and (ii) and amplitude correction derived from the amplitude error, on a suitable medium.

7. The method of claim 1 further comprising:
(i) conveying the logging tool into a borehole and making measurements with the at least one transmitter coil and the at least one receiver coil;
(ii) applying the phase correction to the measurements made in the borehole to provide phase corrected measurements; and
(iii) use the phase corrected measurements for at least one of: (A) determining a formation resistivity, and (B) reservoir navigation.

8. The method of claim 6 further comprising:
(i) conveying the logging tool into a borehole and making measurements with the at least one transmitter coil and the at least one receiver coil;
(ii) applying the amplitude and phase correction to the measurements made in the borehole to provide amplitude and phase corrected measurements; and
(iii) using the amplitude and phase corrected measurements for at least one of: (A) determining a formation resistivity, and (B) reservoir navigation.

9. The method of claim 1 wherein positioning the logging tool above a plate having a flat conducting surface further comprises positioning the logging tool over a plate of a non-magnetic metal.

10. An apparatus configured to evaluate an earth formation, the apparatus comprising:
a logging tool having at least one transmitter coil and at least one receiver coil configured to make multicomponent measurements; the logging tool configured to be positioned substantially parallel to a plate having a flat conducting surface; and
a processor configured to:
determine a phase error in a signal in the at least one receiver coil resulting from activation of the at least one transmitter coil by
(i) measuring differences in phase between a current in the two transmitter coils and corresponding signals in the two receiver coils at a plurality of rotational angles of the tool, and
(ii) determining an average of said differences; and
record at least one of (I) the phase error, and (II) a phase correction derived from the phase error on a suitable medium.

11. The apparatus of claim 10 wherein:
(i) the logging tool is configured for use in a borehole in the earth formation;
(ii) the at least one transmitter coil comprises two transmitter coils configured to be operated sequentially.

12. The apparatus of claim 10 wherein:
(i) the logging tool is configured for use in a borehole in the earth formation;
(ii) the at least one receiver coil comprises two receiver coils.

13. The apparatus of claim 10 wherein the processor is configured to determine the phase error by measuring a difference in phase between a current in the at least one transmitter coil and the signal.

14. The apparatus of claim 10 wherein the processor is further configured to:
(i) determine an amplitude error by comparing an amplitude of the signal with an amplitude obtained from a modeling simulation; and
(ii) record at least one of (I) the amplitude error, and (II) and amplitude correction derived from the amplitude error, on a suitable medium.

15. The apparatus of claim 10 further comprising:
(i) a downhole assembly configured to convey the logging tool into a borehole and make measurements with the at least one transmitter coil and the at least one receiver coil; and
wherein the processor is further configured to:
(ii) apply the phase correction to the measurements made in the borehole to provide phase corrected measurements; and
(iii) use the phase corrected measurements for at least one of: (A) determining a formation resistivity, and (B) reservoir navigation.

16. The apparatus of claim 10 wherein the plate having a flat conducting surface comprises a non-magnetic metal.

17. A computer-readable medium product having stored thereon instructions that when read by a processor cause the processor to execute a method, the method comprising:
determining a phase error in a signal in at least one receiver coil of a logging tool positioned parallel to a plate having a flat conducting surface resulting from activation of at least one transmitter coil of the logging tool by (i) measuring differences in phase between a current in the two transmitter coils and corresponding signals in the two receiver coils at a plurality of rotational angles of the tool, and (ii) determining an average of said differences; and recording at least one of (I) the phase error, and (II) a phase correction derived from the phase error, on a suitable medium.

18. The computer-readable medium product of claim 17 wherein:
the logging tool is further configured for use in a borehole in the earth formation.

19. The computer-readable medium product of claim 17 wherein the medium is selected from the group consisting of (i) a ROM, (ii) an EPROM, (iii) an EAROM, (iv) a Flash Memory, and (v) an optical disk.

* * * * *